United States Patent [19]

Tideswell et al.

[11] Patent Number: 5,214,076
[45] Date of Patent: May 25, 1993

[54] CARBODIIMIDE-ISOCYANURATE ALL WATER BLOWN OPEN CELLED FOAM

[76] Inventors: Richard B. Tideswell, 13219 Singer Rd., Midlothian, Va. 23112; J. S. Costa, Jr., 4736 Cedar Cliff Rd., Chester, Va. 23831

[21] Appl. No.: 946,596

[22] Filed: Sep. 18, 1992

[51] Int. Cl.$^5$ .................. C08G 18/14; C08G 18/78
[52] U.S. Cl. ................... 521/164; 521/172; 521/173; 521/901; 521/902
[58] Field of Search ............ 521/164, 172, 173, 901, 521/902

[56] References Cited

U.S. PATENT DOCUMENTS

| | | | |
|---|---|---|---|
| 3,457,203 | 7/1969 | Cohen et al. | 260/2.5 |
| 3,645,923 | 2/1972 | Kan | 260/2.5 |
| 3,647,759 | 3/1972 | Walker | 260/2.5 R |
| 3,657,161 | 4/1972 | Bernard et al. | 260/2.5 AW |
| 3,928,256 | 12/1975 | Cenker et al. | 260/2.5 AW |
| 4,029,610 | 6/1977 | Narayan et al. | 260/2.5 BF |
| 4,051,082 | 9/1977 | Cenker et al. | 260/2.5 AR |
| 4,151,334 | 4/1979 | Kan et al. | 521/105 |
| 4,256,846 | 3/1981 | Ohashi et al. | 521/117 |
| 4,384,051 | 5/1983 | Guthrie | 521/137 |
| 4,410,641 | 10/1983 | Narayan et al. | 521/167 |
| 4,424,288 | 1/1984 | Patton, Jr. et al. | 521/99 |
| 4,439,549 | 3/1984 | Brennan | 521/131 |
| 4,530,938 | 7/1985 | White | 521/105 |
| 4,544,679 | 10/1985 | Tideswell et al. | 521/116 |
| 4,555,418 | 11/1985 | Snider et al. | 521/160 |
| 4,595,711 | 6/1986 | Wood | 521/158 |
| 4,604,410 | 8/1986 | Altenberg | 521/172 |
| 4,644,019 | 2/1987 | McDaniel | 521/173 |
| 4,780,482 | 10/1988 | Krueger | 521/51 |
| 4,945,018 | 7/1990 | Smits et al. | 521/131 |
| 4,970,018 | 11/1990 | Lunney | 252/182.25 |
| 5,013,766 | 5/1991 | Hanusa | 521/137 |

OTHER PUBLICATIONS

Abstract of Japanese Application No. 092994 filed Jan. 1989 from Derwent Publications, Ltd.
Abstract of Japanese Application No. 092994 filed Sep. 1972.
Aoyagi, M., et al., "Novel Polyols for CFC Reduction," SPI ANTC, pp. 95–100, 1990.
Krueger, D., et al., "Low Density Rigid Foam Without the Use of CFCs," SPI ANTC, pp. 90–94, 1990.

Primary Examiner—Morton Foelak
Attorney, Agent, or Firm—Beveridge, DeGrandi, Weilacher & Young

[57] ABSTRACT

A polycarbodiimide-polyisocyanurate foam is prepared by reacting
(A) mixture of a polyol blend comprising
  (a) 25 to 100% of an aromatic polyester polyol having the following structure:

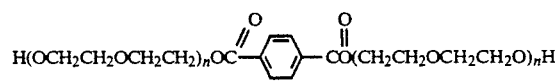

where n=1, 2, or 3 and having hydroxyl number 150 to 330,
  (b) 0 to 35% of a flexible polyether polyol with hydroxyl number 20 to 70,
  (c) 0 to 25% of a toluene diamine ethoxylated polyol, optionally with some propoxylate, and having hydroxyl number 330 to 480,
  (d) 0 to 25% of a nonyl phenol ethoxylate and having hydroxyl number 70 to 9 150, and
with surfactant, catalyst, and water; and reacting with
(B) a polyphenyl polymethylene polyisocyanate such that the mixture of A is reacted with B at a 1:1 by volume mix ratio.

25 Claims, No Drawings

CARBODIIMIDE-ISOCYANURATE ALL WATER BLOWN OPEN CELLED FOAM

BACKGROUND OF THE INVENTION

Chloroflurocarbons (CFCs) apparently act to deplete the ozone layer in the stratosphere, yielding ecological damage. The amount of CFCs and ozone depletion potential can be reduced by using some water or $CO_2$ as blowing agents, and the amount of CFC can be eliminated by using all water or $CO_2$ blowing agents. Water reacts with isocyanate to yield substituted urea and gaseous $CO_2$:

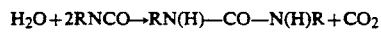

The isocyanate reaction to carbodiimide also generates gaseous $CO_2$:

However, it is known that the $CO_2$-blown foams shrink. In an article entitled "Novel Polyols for CFC Reduction" (M. Aoyagi et al., SPI ANTC (1980), pages 95–100), $CO_2$-blown foam which had passable dimensional stability in low temperature or high temperature accelerated aging tests showed large deformations after a certain passage of time when left at room temperature.

In another article entitled "Low Density Rigid Foam Without the Use of CFCs" (D. C. Krueger et al., SPI ANTC (1990), pages 90–94), a number of all water ($CO_2$) blown urethane foams gave good room temperature dimensional stability but poor stability at elevated temperature. Shrinkage was especially pronounced at 158° F./100% R.H.

In U.S Pat. No. 4,945,119, rigid closed cell urethane foams produced using 5 to 70 mole percent $CO_2$ blowing gave cold shrinkage ($-22°$ F.) unless co-expanded with a low boiling cylindered gas (e.g., CFC-142b having a boiling point of 10° C. or 263.8° K.). A low boiling gas must be included so as to withstand the negative internal pressure from the departing $CO_2$, otherwise shrinkage occurs. The use of low boiling gases will require that current foam producers purchase very expensive processing equipment. Most of the low boiling gases being considered, such as CFC-142b, are HCFCs. The Clean Air Act of 1990 moved up to the end of 1995 the deadline for the U.S. to cease production of CFCs and other ozone depleting chemicals. The HCFCs, such as CFC-142b, will be phased out in the 2015-2030 time frame, with current impetus to move this up. CFC-142b, for example, still has an ozone depletion level of 0.025, though this is lower than $CFCl_3$ with an ozone depletion level of 1.0.

The three references cited above, whereby $CO_2$-blown foams are shown to shrink at room temperature, elevated temperature, and low temperature, show that shrinkage is a problem with $CO_2$-blown foams. Shrinkage is a problem because a freshly made foam containing $CO_2$ in the cells rapidly loses this gas by outward diffusion, leaving a negative internal pressure and possible shrinkage. Conversely, the rate of diffusion of $CFCl_3$ from a foam is almost negligible with much less chance of shrinkage.

In addition, water blowing yields high exotherm or heat of reaction. In the typical $CFCl_3$ expanded urethane foam, the hydroxyl groups react with isocyanate in an exotherm reaction to give a peak exotherm temperature in the 280°–320° F. range. But in an all water blown foam, the water reaction with isocyanate is also exothermic, and adds to the heat generated and now liquids such as $CFCl_3$ cannot be utilized to volatilize and dissipate some of the heat. So all water blown foams give much higher exotherm (e.g., in the 350°–380° F. range). At these high temperatures, foams can thermally split or scorch and char or even burst into flames, and some foams are even deformed and collapse at too high a temperature.

SUMMARY OF THE INVENTION

The present invention discloses the use of novel catalysts and polyol systems for carbodiimide formation. For example, potassium acetate or potassium octoate (the same catalysts used to effect isocyanurate formation) have been found to yield carbodiimide formation at relatively high concentration. Further, the all waterblown, CFC free, carbodiimide-isocyanurate foam is produced using existing foam process equipment so as to mix at 1:1 by volume mix ratios, although the foam could be produced at other mix ratios if desired.

A polycarbodiimide-polyisocyanurate foam is prepared by reacting
(A) a mixture of a polyol blend comprising
  (1) an aromatic polyester polyol having the following structure:

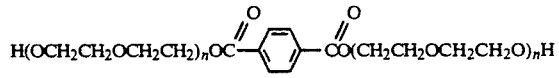

where n=1, 2 or 3 and having hydroxyl number 150 to 330,
  (2) a polyether polyol with hydroxyl number 20–70 generally used to make flexible foam and containing over half primary hydroxyl,
  (3) optionally a toluene diamine (TDA) ethoxylate or ethoxylate/propoxylate polyol having hydroxyl number 330–480,
  (4) optionally a nonyl phenol ethoxylate, hydroxyl number 70–150,
  so as to give a miscible polyol blend composition with hydroxyl number 90–240 range, with surfactant, catalyst, and water; and reacting with
(B) a polyphenyl polymethylene polyisocyanate, such that the mixture of A is reacted with B at a 1:1 by volume mix ratio, although other ratios could be utilized.

DETAILED DESCRIPTION OF THE INVENTION

An all water-blown, CFC free, carbodiimide-isocyanurate-urethane foam is generated at typically 1:1 by volume mix ratio, although other mix ratios may be utilized. The open-celled foam can be generated at relatively low density (e.g., 1.3-1.6 pcf) without shrinkage at 77° F., $-40°$ F., or 158° F./100% R.H. The foam is useful for general purpose void filling and insulation.

The polyol blend comprises:

1. An aromatic polyester polyol made using mostly diethylene glycol or polyethylene glycols; said aromatic polyester polyol having hydroxyl number 150-330, preferably OH#200-300, and most preferably hydroxyl number 220-260.

The aromatic polyester polyols utilized in the present invention can be any of several available, such as Terate 254, Chardol 170, Stepan Pol PS-2502A, Terol 250, Chardol 196, etc. (as described in U.S. Pat. No. 4,981,879 which is incorporated by reference in its entirety). The aromatic polyester polyol generally contains predominantly primary OH groups. Predominantly primary OH groups mean that approximately 100% of the OH groups are primary (e.g., Ter-254, Chardol 170, Stepan PS-2502A); in addition, Chardol 196 (estimated 55-60% primary OH) may also be utilized.

2. A flexible polyether polyol with hydroxyl number 20-70 range.

3. A toluene diamine (TDA) ethoxylate polyol, with optionally some propoxylate, and having hydroxyl number 360-470.

4. A nonyl phenol ethoxylate, hydroxyl number 80-130.

The present invention is directed in one respect to a miscible polyol blend composition useful in the preparation of carbodiimide-isocyanurate-urethane foams. In another respect, the polyol blend composition is such that foams can be generated at 1:1 by volume mix ratios in existing process equipment, although other mix ratios could be utilized if so desired.

The polyol composition of the present invention is as follows:

|  | % by weight | | |
| --- | --- | --- | --- |
|  | range | preferred | most preferred |
| 1. aromatic polyester polyol | 25-100 | 25-70 | 30-50 |
| 2. flexible polyether polyol | 0-50 | 10-35 | 15-25 |
| 3. TDA ethoxylate | 0-30 | 10-30 | 15-25 |
| 4. nonyl phenol ethoxylate | 0-30 | 10-30 | 15-25 |

The polyol composition can contain component 1 by itself, with only one of components 2-4, or only two of components 2-4, or all three of components 2-4.

The term "polyol" as used herein has reference to a molecule containing two or more hydroxyl groups. In any given such polyol blend composition, the above indicated components are selected so as to result in a product polyol blend composition having a hydroxyl number in the range from about 90 to 240.

The foams are generated preferably with methylene bis diisocyanate (MDI) having functionability of 2.3 to 2.8, preferably 2.6 to 2.7, with viscosity at 25° C. of about 200 cps.

The foams are generated at a 1:1 by volume mix ratio of A:B; where A is the premix or blend of polyols, surfactant, catalyst and water, and any organic acid adulterant, and B is the isocyanate. The isocyanate index is 80 to 270 based on ROH (and any COOH adulterant), plus additional isocyanate for the water reaction to substituted urea. The isocyanate index is preferably 100 to 140 on ROH, plus additional isocyanate for the water reaction to substituted urea.

The amount of water used to blow the carbodiimide isocyanurate foams is about 2.7 to 5.5, preferably 3 to 4, parts per hundred parts (php) of polyol. The water-isocyanate reaction yields urea groups that give a friable foam structure. The carbodiimide structure, being linear, gives a more rubbery foam structure. In fact the carbodiimide-isocyanurate foam of the present invention are very resilient.

All php refer to parts per hundred parts of the polyol blend (A).

The foam are generated at component temperatures 75° to 140° F., preferably 120° to 140° F.

Relatively high concentrations of potassium acetate or potassium octoate are required in order to effect carbodiimide formation (e.g., about 3-6 (php) Polycat-46 which is a solution of potassium acetate in glycol sold by Air Products). But then foam speed may be too fast and cause splits and scorch in the foam. The use of about 0.5-2.5 (php) of an organic acid such as formic acid, acetic acid, 2-ethyl hexoic acid, etc. proved useful in buffering the system to give slower foam speed without splits and scorch. Other acids such as isobutyric acid, n-caprylic acid, caproic acid, 3-methyl valeric acid, propionic acid, etc. can also be utilized.

The use of a good water-blowing catalyst (for example 0.2 to 0.5 (php) pentamethyldiethylene triamine) gave faster initial foaming reaction and finer cells. Some other good blowing catalysts are Texaco Chemical Company Texacat ZR-70, ZF-10, etc.

Another means to generate the carbodiimide foams of the present invention is to use a polyol or polyols that promote carbodiimide formation Particularly effective polyols in promoting carbodiimide formation have been found to be the toluene diamine (TDA) ethoxylates, optionally with some propoxylate (e.g., toluene diamine alkoxylated with 3-8 moles ethylene oxide and 0-4 moles propylene oxide; preferably 3.5 moles ethylene oxide and 4 moles propylene oxide). Particularly effective polyols of this nature are listed as follows: Pluracol 735, Pluracol 824, Multranol 4063, Multranol 9166, Dow XAS-10797.00, etc. The TDA ethoxylated polyol is used in the range of 10 to 30% of the polyol blend, and preferably 15 to 25% of the polyol blend. A catalyst level of about 0.4 to 1.0 php K-977 or K-15 potassium octoate was used. The K-977 or K-15 is a solution of potassium octoate in glycol.

Carbodiimide catalysts are numerous, but only cyclic phospholene oxides, such as 1-phenyl-3-methyl-2-phospholene-1-oxide, 1-methyl-3-phospholene-1-oxide, and 1-ethyl-3-methyl-3-phospholene oxide have the high degree of reactivity necessary to cause rapid formation of cellular products. Catalysts of the present invention are far less costly and more readily available.

EXAMPLES

The following are examples of polycarbodiimide-polyisocyanurate foams according to the present invention. All parts are given by weight.

EXAMPLE 1

Forty parts Ter-254, 20 pts. GP-3010, 20 pts. Pluracol 735, 20 pts. B-315, 2.0 pts. L-5420 surfactant, 0.4 pts. K-977 potassium octoate and 0.2 pts. Polycat 5 (pentamethyldiethylene triamine) and 4 pts. water were blended to give 106.6 pts. premix or A component. The Viscosity of A was 1200 cps at 77° F. The A component was mixed with 119.3 pts. Lupranate M-20 or B component that gave 1:1 by volume mix ratio A:B.

Components were metered through an E.R. Carpenter Co. 1100 series pump at the 1:1 by volume mix ratio through an EZ-500 gun used in packaging foam at 120°-140° F. component temperatures. The calculated index on ROH was 117.

Foam times follow: cream 2 sec, gel 18 sec, tack-free 41 sec, rise 58 sec. A fine celled foam was produced with the following properties:

| | |
|---|---|
| density, pcf. | 1.35 |
| % open cell | 94 |
| compressive strength, psi | |
| parallel | 9 |
| perpendicular | 7 |
| tensile strength, psi | |
| parallel | 20 |
| perpendicular | 9 |
| K-factor, 2 weeks | 0.276 |
| Shrinkage, % change | |
| 74° F., 2 weeks | 0.0 |
| 158° F./95% R.H., 16 hrs. | 0.0 |
| −40° F., 16 hrs. | 0.0 |

EXAMPLES 2-6 were prepared analogously to example 1:

| pbw | 2 | 3 | 4 | 5 | 6 |
|---|---|---|---|---|---|
| Terate 254 | 25.0 | 55.0 | 32.5 | 32.5 | 35.0 |
| GP-3010 | 35.0 | 25.0 | 27.5 | 27.5 | 35.0 |
| Pluracol 735 | 20.0 | 20.0 | 20.0 | 20.0 | 20.0 |
| B-315 | 20.0 | — | 20.0 | 20.0 | 10.0 |
| L-5420 | 2.2 | 2.2 | 2.0 | 2.0 | 2.2 |
| K-977 | 0.8 | 0.8 | 0.8 | 0.2 | 0.8 |
| Desmorapid PV | 0.2 | 0.2 | 0.2 | 0.2 | 0.2 |
| water | 4.0 | 3.8 | 4.0 | 4.0 | 3.8 |
| Total "A" | 107.2 | 107.0 | 107.0 | 106.4 | 107.0 |
| Lupranate M-20 S | 121.2 | 118.7 | 120.3 | 120.3 | 118.7 |
| index on ROH | 134 | 88 | 125 | 125 | 102 |
| B/A temp., °F. | 120/120 | 120/120 | 120/120 | 120/120 | 120/120 |
| cream, sec | 4 | 4 | 5 | 5 | 4 |
| gel, sec | 18 | 21 | 16 | 32 | 21 |
| tack-free, sec | — | 35 | 28 | 80 | 37 |
| rise, sec | — | 55 | 72 | 70 | 60 |
| density, pcf | 1.47 | 1.58 | 1.46 | 1.99 | 1.58 |
| shrinkage | | | | | |
| 77° F., 1 day | none | none | none | very slight | none |
| 158° F., 95% RH, 1 day | none | none | none | none | none |

EXAMPLES 7-11 were prepared analogously to example 1:

| pbw | 7 | 8 | 9 | 10 | 11 |
|---|---|---|---|---|---|
| Chardol-196 | 50.0 | 60.0 | 100.0 | — | — |
| Terate-254 | — | — | — | 50.0 | 50.0 |
| GP-6500 | 50.0 | 25.0 | — | 50.0 | 50.0 |
| Voranol 360 | — | 15.0 | — | — | — |
| Formic Acid | 1.0 | 1.0 | 1.0 | — | — |
| L-5420 | 2.0 | 2.0 | 2.0 | 2.0 | 2.0 |
| PC-46, KOAc | 4.8 | 5.0 | 5.0 | 2.5 | 2.5 |
| PC-5 | — | — | — | — | 0.5 |
| water | 3.1 | 3.4 | 3.1 | 4.0 | 4.0 |
| total "A" | 110.9 | 111.4 | 111.1 | 108.5 | 109.0 |
| Lupranate M-20 | 122.5 | 125.9 | 125.2 | 123.0 | 123.0 |
| index on ROH & COOH | 260 | 191 | 147 | 172 | 172 |
| B/A temp,°F. | 77/77 | 77/77 | 77/77 | 120/120 | 120/120 |
| cream, sec | 13 | 14 | 28 | 14 | 5 |
| gel, sec | 36 | 30 | 53 | 27 | 17 |
| tack-free, sec | 44 | 33 | 57 | 36 | 25 |
| rise, sec | — | 64 | 80 | 70 | 40 |
| density, pcf. | 1.41 | 1.29 | 1.37 | 1.62 | 1.63 |
| shrinkage 77° F., 2 weeks | 0 | 0 | 0 | 0 | 0 |
| % open cell | 95 | 74 | 94 | — | — |

EXAMPLES 12-14 were prepared analogously to example 1:

| pbw | 12 | 13 | 14 |
|---|---|---|---|
| Terate 254 | 100.0 | — | 100.0 |
| Chardol 196 | — | 100.0 | — |
| formic acid | 1.0 | — | — |
| L-5420 | 2.0 | 2.0 | 2.0 |
| PC-46, KOAc | 3.5 | 3.5 | 2.5 |
| water | 3.1 | 3.1 | 3.1 |
| total "A" | 109.6 | 108.6 | 107.6 |
| Lupranate M-20 | 117.3 | 113.6 | 115.3 |
| index on ROH and COOH | 104 | 127 | 109 |
| B/A temp., °F. | 120/120 | 120/120 | 120/120 |
| Cream, sec | 11 | 8 | 15 |
| Gel, sec | 25 | 14 | 22 |
| Tack-free, sec | 29 | 16 | 24 |
| Rise, sec | 50 | 34 | 48 |
| density, pcf | 1.36 | 1.32 | 1.61 |
| shrinkage 77° F., 2 weeks | 0 | 0 | 0 |

Further variations and modifications of the invention will become apparent to those skilled in the art from the foregoing and are intended to be encompassed by the claims appended hereto.

What is claimed:

1. A polycarbodiimide-polyisocyanurate foam prepared by reacting
   (A) mixture of a polyol blend comprising
   (1) 25 to 100% of an aromatic polyester polyol having the following structure:

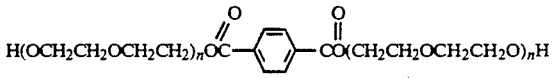

where n = 1, 2, or 3
   and having hydroxyl number 150 to 330,
   (2) 0 to 50% of a flexible polyether polyol with hydroxyl number 20 to 70;
   (3) 0 to 30% of a toluene diamine ethoxylated polyol, optionally with some propoxylate, and having hydroxyl number 330 to 480,
   (4) 0 to 30% of a nonyl phenol ethoxylate and having hydroxyl number 70 to 150, with surfactant, catalyst, and water, and reacting with
   (B) a polyphenyl polymethylene polyisocyanate, such that the mixture of A is reacted with B at a 1:1 by volume mix ratio.

2. The foam according to claim 1, wherein said mixture of a polyol blend comprises (1) 30 to 50% of said aromatic polyester polyol, (2) 15 to 25% of said flexible polyether polyol, (3) 15 to 25% of said toluene diamine ethoxylated polyol, and (4) 15 to 25% of said nonyl phenol ethoxylate.

3. The foam according to claim 1, wherein said toluene diamine ethoxylated polyol has hydroxyl number 360 to 470 and said nonyl phenol ethoxylate has hydroxyl number 80 to 130.

4. The foam according to claim 1, wherein said aromatic polyester polyol is selected from the group consisting of Terate 254, Chardol 170, Stepan Pol PS-2502A, Terol 250, and Chardol 196.

5. The foam according to claim 1, wherein said aromatic polyester polyol contains predominantly primary OH groups.

6. The foam according to claim 1, wherein said catalyst is potassium acetate or potassium octoate.

7. The foam according to claim 1, wherein said catalyst is 0.4 to 1.0 php potassium octoate.

8. The foam according to claim 1, wherein said catalyst is potassium octoate and pentamethyldiethylenetriamine.

9. The foam according to claim 1, wherein said polyol blend has hydroxyl number 90-240.

10. The foam according to claim 1, wherein said (B) has a MDI isocyanate functionality of 2.6-2.7 with viscosity at 25° C. of about 200 cps.

11. The foam according to claim 1, wherein the amount of said water is 3-4 php.

12. The foam according to claim 1, wherein said (A) further comprises 0.5-2.5 php organic acid.

13. The foam according to claim 12, wherein said acid is formic acid.

14. The foam according to claim 12, wherein said acid is selected from the group consisting of 2-ethyl hexoic acid, acetic acid, formic acid, isobutyric acid, n-caprylic acid, caproic acid, 3-methyl valeric acid, propionic acid, and mixtures thereof.

15. The foam according to claim 1, wherein said foam has a isocyanate index of 80 to 270 based on ROH.

16. The foam according to claim 15, wherein said isocyanate index is 100 to 140 based on ROH.

17. The foam according to claim 1, wherein the reaction temperature is 75° to 140° F.

18. The foam according to claim 17, wherein said reaction temperature is 120° to 140° F.

19. The foam according to claim 1, wherein said aromatic polyester polyol of (a) is modified with aliphatic acid.

20. The foam according to claim 19, wherein said aliphatic acid is a tall oil fatty acid.

21. The foam according to claim 19, wherein said aliphatic acid is dibasic acid waste streams or a mixture of succinic acid, glutaric acid and adipic acid.

22. The foam according to claim 19, wherein said aliphatic acid is fatty acids or soybean oil.

23. The foam according to claim 1, wherein said aromatic polyester polyol has hydroxyl number 220 to 260.

24. The foam according to claim 1, wherein said toluene diamine (TDA) ethoxylate polyol is selected from the group consisting of Pluracol 735, Pluracol 824, Multranol 4063, Multranol 9166, and Dow XAS-10797.00.

25. A polycarbodiimide-polyisocyanurate foam prepared by reacting
(A) mixture of a polyol blend comprising
  (1) 25 to 70% of an aromatic polyester polyol having the following structure:

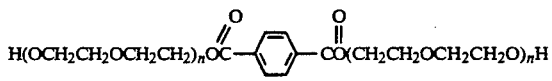

where n=1, 2, or 3
  and having hydroxyl number 150 to 330,
  (2) 10 to 35% of a flexible polyether polyol with hydroxyl number 20 to 70,
  (3) 10 to 30% of a toluene diamine ethoxylated polyol, optionally with some propoxylate, and having hydroxyl number 330 to 480,
  (4) 10 to 30% of a nonyl phenol ethoxylate and having hydroxyl number 70 to 150, with surfactant, catalyst, and water, and reacting with
(B) a polyphenyl polymethylene polyisocyanate, such that the mixture of A is reacted with B at a 1:1 by volume mix ratio.

* * * * *